(12) United States Patent
Okubo

(10) Patent No.: US 9,906,581 B2
(45) Date of Patent: Feb. 27, 2018

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/559,232

(22) Filed: Dec. 3, 2014

(65) Prior Publication Data

US 2015/0188986 A1  Jul. 2, 2015

(30) Foreign Application Priority Data

Dec. 26, 2013  (JP) ................................. 2013-270559

(51) Int. Cl.
- *G06F 15/16* (2006.01)
- *H04L 29/08* (2006.01)
- *H04L 29/06* (2006.01)

(52) U.S. Cl.
CPC ............. *H04L 67/06* (2013.01); *H04L 69/14* (2013.01)

(58) Field of Classification Search
CPC ............................... H04L 67/06; H04L 69/14
USPC ........................................................ 709/219
See application file for complete search history.

(56) References Cited

U.S. PATENT DOCUMENTS

| | | | | |
|---|---|---|---|---|
| 2009/0089355 A1* | 4/2009 | Kudo | ..................... | G06K 15/02 709/201 |
| 2011/0078325 A1* | 3/2011 | Vanover | .................. | H04L 63/10 709/232 |
| 2011/0225302 A1* | 9/2011 | Park | .................... | H04L 65/4084 709/227 |
| 2012/0215839 A1* | 8/2012 | Doyle | .................... | H04L 67/06 709/203 |
| 2013/0262625 A1* | 10/2013 | Watson | ............... | H04L 65/4069 709/217 |
| 2014/0325024 A1* | 10/2014 | Lyle | .................. | H04L 29/08027 709/219 |

FOREIGN PATENT DOCUMENTS

JP  2013-049204 A  3/2013

* cited by examiner

*Primary Examiner* — Nicholas Taylor
*Assistant Examiner* — Meng Vang
(74) *Attorney, Agent, or Firm* — Fitzpatrick, Cella, Harper & Scinto

(57) ABSTRACT

Provided is an information processing apparatus that establishes first communication connection with a server device, acquires information indicating whether or not content has been generated from the server device which dynamically generates the content, establishes second communication connection with the server device, and acquires the generated content. The information processing apparatus maintains the second communication connection until the content is completely acquired.

18 Claims, 8 Drawing Sheets

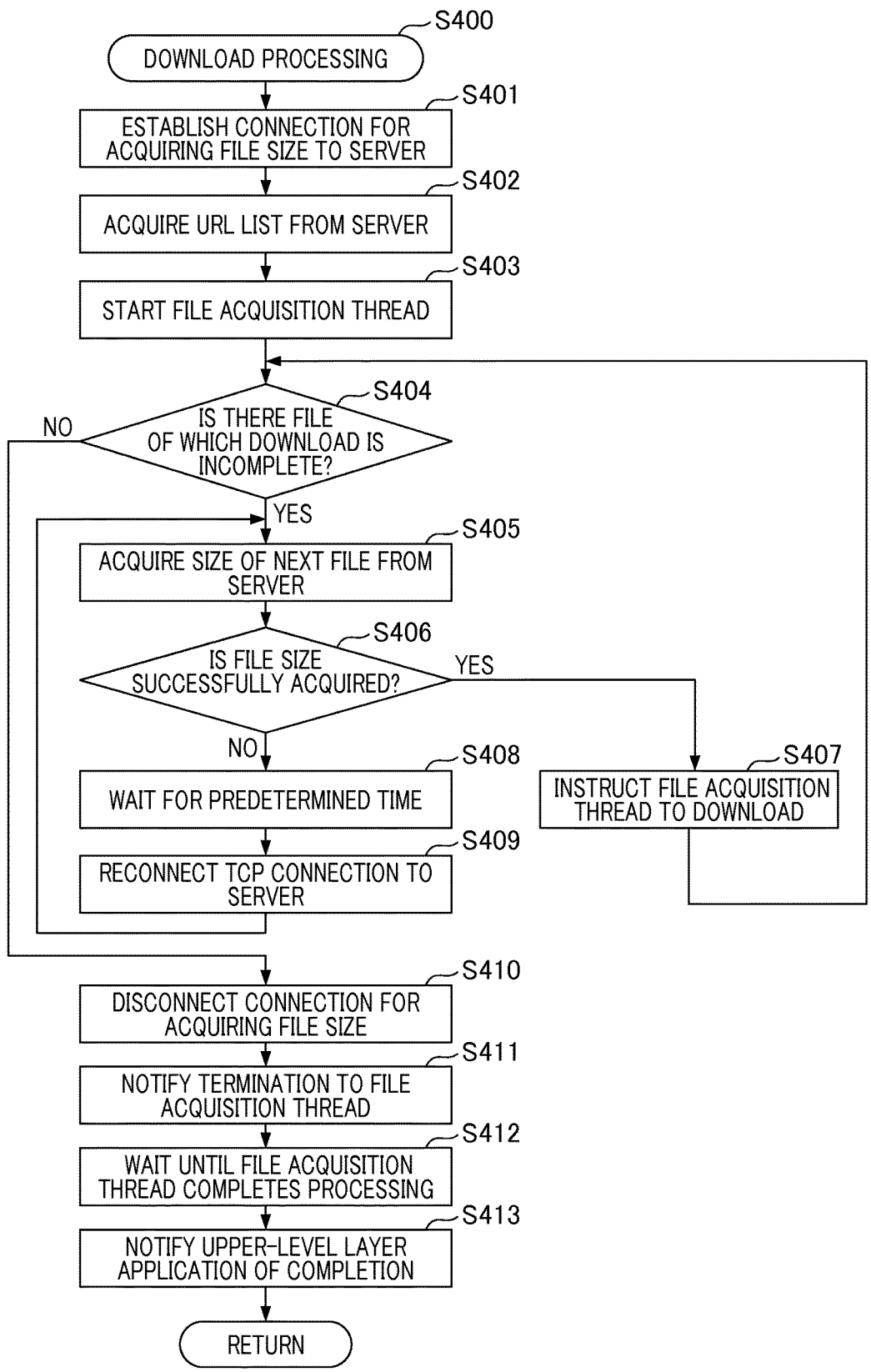

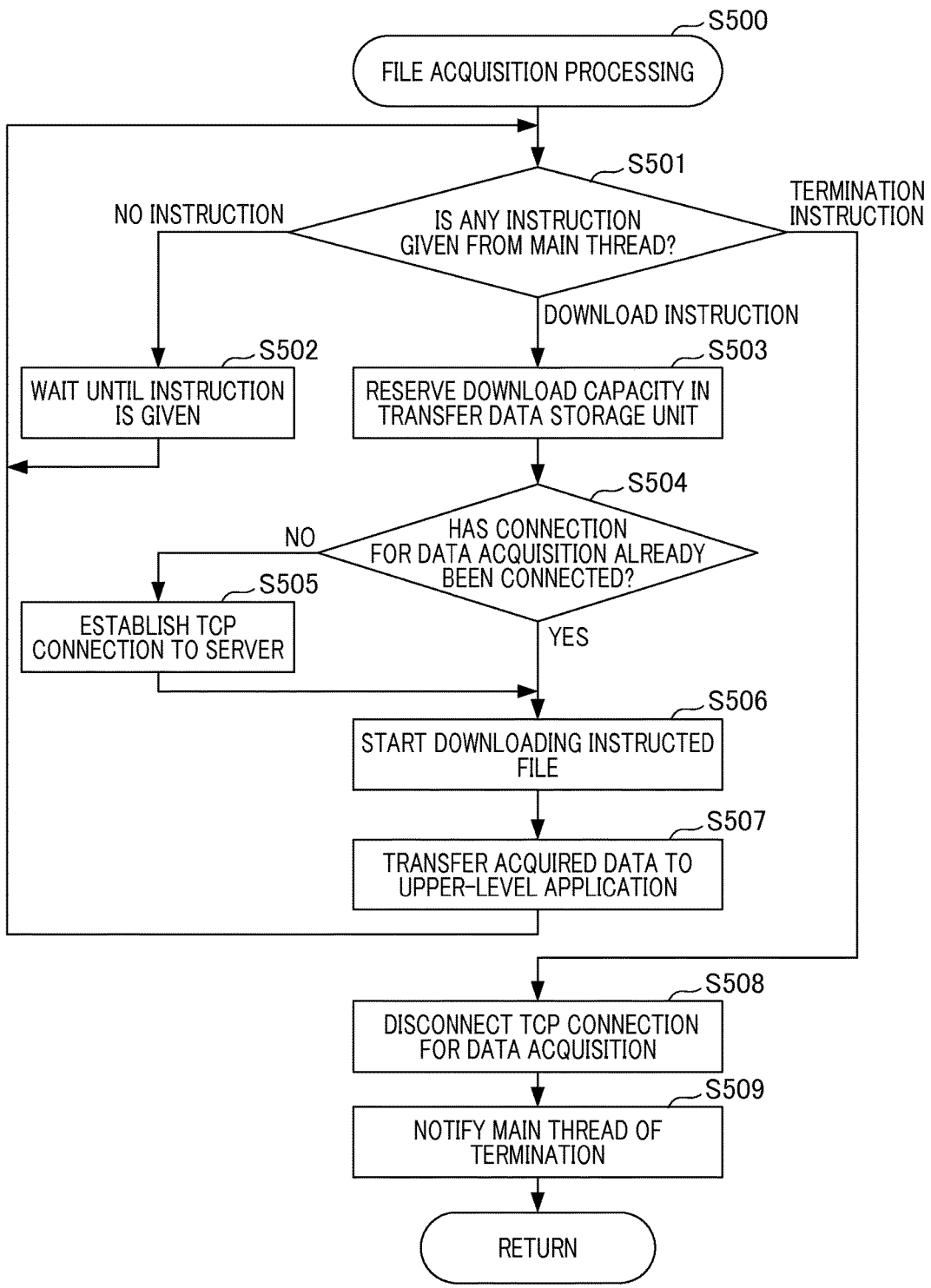

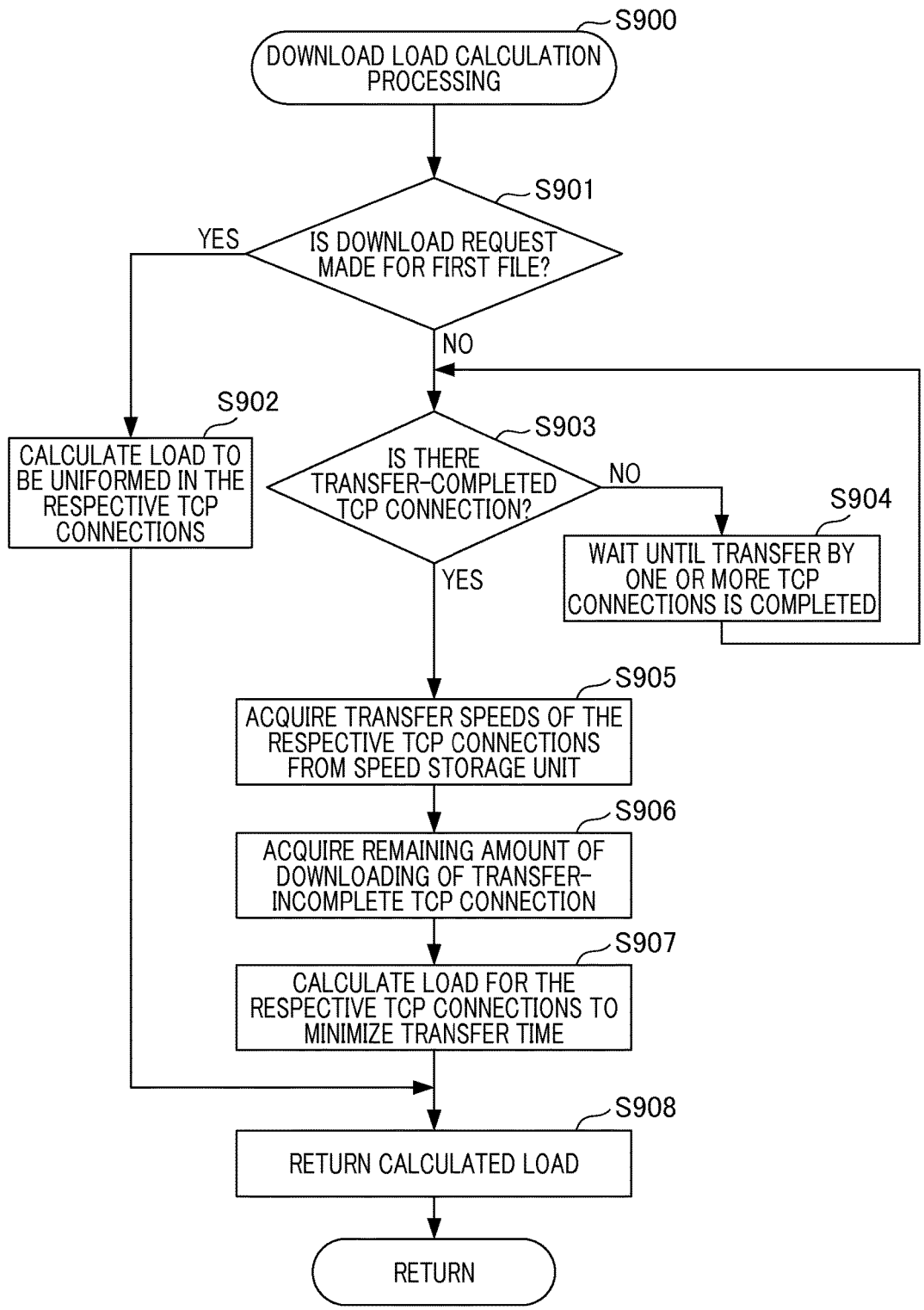

INFORMATION PROCESSING APPARATUS, CONTROL METHOD, AND STORAGE MEDIUM

BACKGROUND OF THE INVENTION

Field of the Invention

The present invention relates to a technique for speeding up the acquisition of content to be dynamically generated.

Description of the Related Art

There has been proposed a Web service that dynamically generates content in accordance with a content acquisition request issued from a user. For example, the Web service includes a print service utilizing an electronic mail, a data format conversion service utilizing a cloud system, or the like. The Web service is provided by utilizing Internet, and thus, communication quality is not constant as compared with the existing structure. Thus, the communication may be disconnected during a communication. In order to address such a case, there has been proposed a method for efficiently resuming processing even if the communication is disconnected during a communication (see Japanese Patent Laid-Open No. 2013-49204).

However, in the case of a Web service for dynamically generating content, no content may be prepared when a communication between a client computer and a server computer is established for acquiring content.

If content acquisition is attempted despite the fact that no content is prepared, a communication may be disconnected from a server computer. In particular, when a Web server returns an error to a client computer, connection is generally disconnected from the Web server side. In this case, the client computer needs to be reconnected to the Web server, but a communication speed may be reduced by the influence of a congestion-avoidance algorithm upon reconnection in TCP. In particular, such influence significantly occurs in a long distance environment such as a mobile communication, a cross-continent communication, or the like.

SUMMARY OF THE INVENTION

The present invention provides an information processing apparatus that realizes the speeding up of a data communication with a server device by maintaining a communication connection for content acquisition with use of a plurality of communication connections.

According to an aspect of the present invention, an information processing apparatus is provided that includes a first communication unit configured to establish first communication connection with a server device to acquire information indicating whether or not content has been generated from the server device which dynamically generates the content; and a second communication unit configured to establish second communication connection with the server device to acquire the generated content. The second communication unit maintains the second communication connection until the content is completely acquired.

Further features of the present invention will become apparent from the following description of exemplary embodiments with reference to the attached drawings.

BRIEF DESCRIPTION OF THE DRAWINGS

FIG. 4 is a flowchart illustrating download processing performed by a data acquisition processing unit.

FIG. 5 is a flowchart illustrating file acquisition processing performed by the data acquisition processing unit.

FIG. 9 is a flowchart illustrating download load calculation processing.

DESCRIPTION OF THE EMBODIMENTS

Firstly, terminologies to be used in the present specification will be defined. The term "transmission control protocol (TCP)" refers to a protocol which is generally used for communication requiring reliability such as file transmission/reception. For the details of TCP, see http://tools.ietf.org/html/rfc793.

The term "hypertext transfer protocol (HTTP)" refers to a protocol which is used for transmission/reception of various content between a Web client and a Web server. For the details of HTTP, see http://tools.ietf.org/html/rfc2616. In the Web service, a communication is performed using the HTTP.

The term "socket" refers to notation for identifying and classifying a communication path in a transmission control protocol (TCP) layer. In most cases, an internet protocol (IP) is generally used as a lower-level layer, and, in this case, the socket is a set of an IP address and a TCP port number.

The term "TCP connection" means a communication path in the TCP layer. More specifically, the TCP connection is a set of reception-side socket and transmission-side socket.

The term "reception window size" refers to the size of a reception buffer region in the TCP protocol.

The term "transmission window size" refers to the size of a transmission buffer region in the TCP protocol.

The TCP can prevent a buffer overflow by reporting the remaining reception window size to the transmission side. The TCP also attempts to increase a communication speed by gradually increasing a transmission window size. On the other hand, a simple increase in the transmission window size may lead to the congestion in the communication path, and thus, a congestion-avoidance algorithm for controlling such a window size is needed. Examples of the widely-known congestion-avoidance algorithm include Tahoe, Reno, and the like.

In the present specification, the term "session" means a bundle of one or more TCP connections. The session is a bundle of a plurality of TCP connections to be used upon transmission/reception of a file by dividing it.

(First Embodiment)

Figure 1:
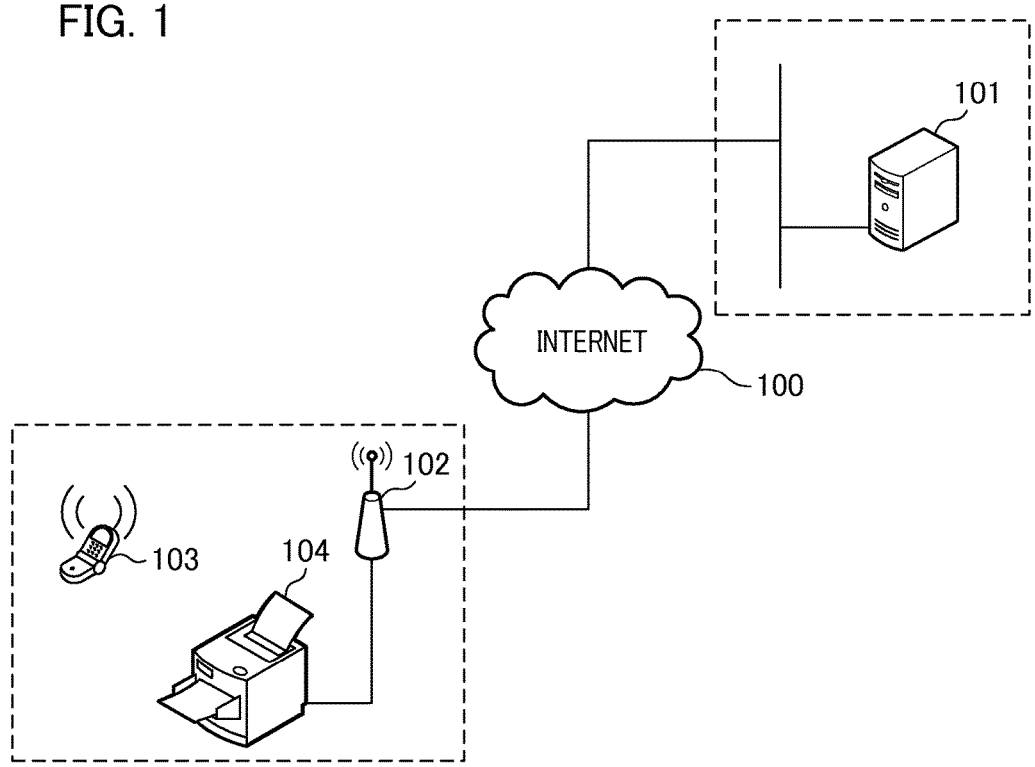
FIG. 1 is a diagram illustrating an example of a network configuration according to one embodiment of the present invention.

FIG. 1 is a diagram illustrating an example of a system configuration according to one embodiment of the present invention. The system shown in FIG. 1 is constituted by a client computer 103, an image processing apparatus 104, and a server computer 101. The client computer 103 and the image processing apparatus 104 can be connected to the server computer 101 via a wireless router 102 and Internet 100. The Internet 100 is a communication line for exchanging information among the above respective apparatuses across a firewall. The Internet 100 is a communication line network that supports, for example, TCP/IP protocols. In FIG. 1, the server computer 101 is indicated as a server computer 101 but it may be configured by a plurality of server computers. Alternatively, it may be configured as a virtual personal computer (PC).

The wireless router 102 is connected to the Internet 100. The wireless router 102 can be in wireless communication with the client computer 103, and can also be in wired or wireless communication with the image processing apparatus 104. The client computer 103 and the image processing apparatus 104 are communicable with each other via the wireless router 102.

Figure 2:
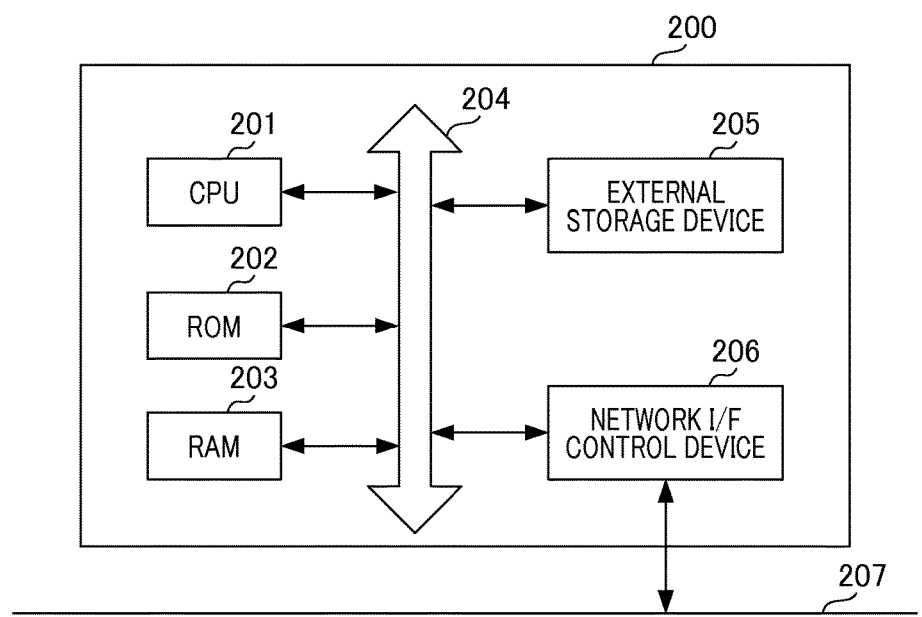
FIG. 2 is a diagram illustrating an example of a hardware configuration of the server or the information processing apparatus of the present invention.

FIG. 2 is a block diagram illustrating an example of a hardware configuration of the client computer 103 that functions as the information processing apparatus shown in FIG. 1 or the server computer 101 that functions as a server device. Unless otherwise specified, if the functions of the present invention are executed, it is needless to say that even a single device, or a system composed of a plurality of devices can use the technique of the present invention. Further, unless otherwise specified, if the functions of the present invention are executed, it is needless to say that even a system in which connections are established and processes are performed via a network such as a LAN, a WAN, a WWAN, or an Internet can apply the technique of the present invention. Note that LAN, WAN, and WWAN are abbreviation for Local Area Network, Wide Area Network, and Wireless Wide Area Network, respectively.

A computer 200 of the client computer 103 or the server computer 101 includes a CPU 201, a ROM 202, a RAM 203, an external storage device 205, and a network I/F control device 206. The respective processing units transmit/receive data to/from each other via a system bus 204. The CPU 201 comprehensively controls respective devices connected to the system bus 204. The CPU 201 executes various processing for graphics, images, characters, tables (including spreadsheets, etc.), and the like based on a document processing program or the like stored in a program ROM of the ROM 202 or the external storage device 205. The configuration of the computer 200 is not limited to the above processing units but may also include other input/output unit(s). The client computer 103 or the server computer 101 may establish connection by wireless communication. Note that CPU, ROM, and RAM are abbreviation for Central Processing Unit, Read Only Memory, and Random Access Memory, respectively.

The program for implementing the present invention is stored in the ROM 202, the RAM 203, or the external storage device 205. The CPU 201 executes the program to thereby implement the respective processes. The program ROM of the ROM 202 or the external storage unit 205 stores an operation system or the like which is a control program of the CPU 201. The data ROM of the ROM 202 or the external storage unit 205 stores various types of data including the program for implementing the present invention. The RAM 203 functions as a main memory, a work area, or the like of the CPU 201, and the network I/F control device 206 controls transmission/reception of data to/from a LAN 207.

Figure 3:
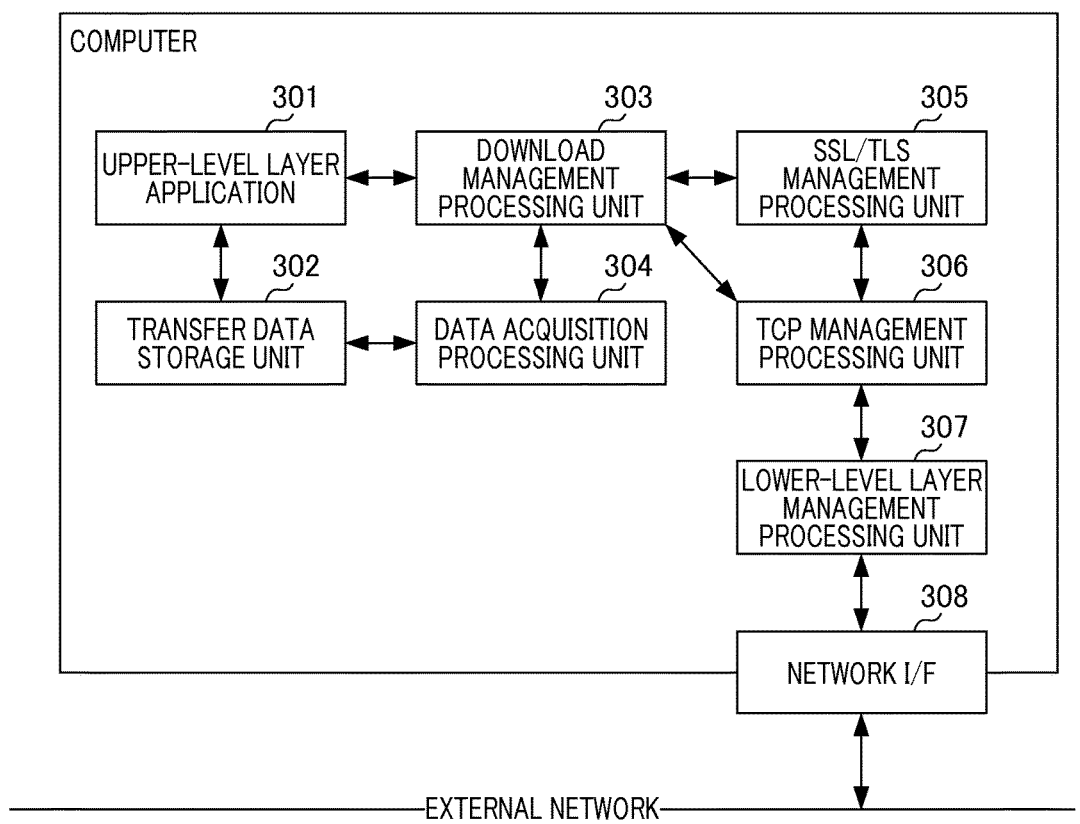
FIG. 3 is a diagram illustrating an example of a software configuration of the server or the information processing apparatus of the present invention.

FIG. 3 is a diagram illustrating an example of a software configuration of the computer 200. The computer shown in FIG. 3 includes an upper-level layer application 301, a transfer data storage unit 302, a download management processing unit 303, a data acquisition processing unit 304, an SSL/TLS management processing unit 305, a TCP management processing unit 306, a lower-level layer management processing unit 307, and a network I/F 308. A management mechanism up to the TCP layer may use any implementation method as long as the mechanism satisfies a transmission control protocol defined by the RFC 793 and provides an available application program interface (API). In other words, any implementation may be used as long as the TCP management processing unit 306 and the lower-level layer management processing unit 307 provide an appropriate API. Although the TCP management processing unit 306 and the lower-level layer management processing unit 307 generally provide an operating system in most cases, the operating system may be directly implemented on the management mechanism required for the present invention. The implementation method is generally well known and thus no detailed description thereof will be given.

The download management processing unit 303 manages reception processing using a plurality of TCP connections, and provides an interface to the upper-level layer application 301. The download management processing unit 303 also manages transmission/reception of data to/from a lower-level layer. The download management processing unit 303 performs not all the processings and entrusts the data acquisition processing unit 304 with TCP connection processing.

In the present embodiment, the download management processing unit 303 and the data acquisition processing unit 304 are described in the form of one software library. However, the function may be performed by the operating system itself or may also be implemented by the hardware of the network I/F 308 which is an interface to external network. In other words, the function may be performed at any location as long as the equivalent function and interface can be provided to the upper-level layer application 301.

The data acquisition processing unit 304 manages a TCP connection. More specifically, the data acquisition processing unit 304 manages connection of the TCP connection, transmission/reception of data, and the like, and notifies the upper-level layer application 301 of the result. The data acquisition processing unit 304 also stores data received from the server computer 101 in the transfer data storage unit 302.

Here, consider that, when the client computer 103 is assumed as a mobile terminal and printing is performed from the mobile terminal to the image processing apparatus 104, there is a service for converting an image received from the mobile terminal by the server computer 101 into an image comprehensible to an image processing apparatus. The mobile terminal functions as an information processing apparatus for implementing the present invention. In the present embodiment, HTTP is used as a communication protocol. Of course, other protocols or a unique protocol may also be used.

A detailed description will be given of the implementation of the client computer 103 in order to explain the feature of the present invention. Note that it is assumed that the server computer 101 meets the function of the typical HTTP server so that the Keep-Alive function in HTTP 1.1, the GET command, and the HEAD command can be used.

Next, a description will be given of transmission/reception of data using the present invention. FIG. 4 shows the flow of processing upon start of communication. Firstly, the download management processing unit 303 receives a communication start request from the upper-level layer application 301. Next, the download management processing unit 303 passes information obtained from the upper-level layer application 301 to the data acquisition processing unit 304 to request for downloading content. The data acquisition processing unit 304 performs TCP multi-connection processing (400) based on the URI to be downloaded.

In step S401, the data acquisition processing unit 304 establishes connection of the TCP connection for acquiring a file size to the server computer 101. Here, the term "size" refers to the Content-Length header in the HTTP. In other words, the data acquisition processing unit 304 establishes connection of the TCP connection dedicated for acquiring the size of a file to be downloaded. The size acquiring connection is used not only for acquiring the size of a file to be downloaded but also for confirming whether or not the server computer 101 has completely generated the relevant file.

In step S402, the data acquisition processing unit 304 acquires a URL list from the server computer 101. Here, the term "URL list" refers to the list of URLs of files to be generated by the server computer 101. Although the URL of a file to be acquired by the client computer 103 is described on the URL list, completion of the file is not ensured at this point. If an attempt is made to acquire an incomplete file, an error HTTP response is returned from the server computer 101.

In step S403, the data acquisition processing unit 304 initializes a file acquisition thread and starts the thread. The term "file acquisition thread" refers to a section other than the header in the HTTP response, i.e., a body section including a section of data printable by the image processing apparatus. A thread dedicated for acquiring a body section of the HTTP is started at this point. A thread used for starting a file acquisition thread (step S403) may not be the native thread from an OS but one thread may also be used as long as it can handle a plurality of TCP connections.

In step S404, if there is a file of which download is incomplete, the data acquisition processing unit 304 performs the remaining download processing, and thus, the processing shifts to step S405. On the other hand, if all the download process is completed, the processing shifts to step S410.

In step S405, the data acquisition processing unit 304 selects a next file of which the file size has not yet been acquired from the URL list, and then acquires the file size of the relevant file from the server computer 101. The data acquisition processing unit 304 can obtain the response of only the header including a file size section using the HEAD command of the HTTP. While the HTTP is used in the present embodiment, any protocol may be used as long as it can acquire a file size or can confirm the generation of content.

If the file size can successfully be acquired from the server computer 101 in step S406, the data acquisition processing unit 304 instructs the file acquisition thread to download the relevant file in step S407. On the other hand, if the file size cannot successfully be acquired, the processing shifts to step S408. If it is determined from the content of the HTTP response obtained in step S405 that a critical error exits, abnormity processing is immediately performed. In other words, the processing shifts to step S408 only if file acquisition can be expected such as a case where a file is incomplete.

In step S408, the data acquisition processing unit 304 waits for a predetermined time. The waiting in step S408 is to wait for the generation of a file by the server computer 101, and the waiting time may be dynamically changed by obtaining some hint from a predetermined time or the server computer 101.

After the waiting in step S408, the data acquisition processing unit 304 performs reconnection of a TCP connection for acquiring a file size in step S409. Then, the processing shifts to step S405, and the data acquisition processing unit 304 attempts to acquire a file size from the server computer 101.

In step S410, the data acquisition processing unit 304 disconnects a connection for acquiring a file size. Then, the data acquisition processing unit 304 sends a termination notification to the file acquisition thread in step S411, and waits in step S412 until the file acquisition thread completes processing. After completion of all the processing, the data acquisition processing unit 304 notifies the upper-level layer application 301 of the completion of downloading in step S413.

Next, a description will be given of file acquisition processing (500) representing the processing performed by the file acquisition thread with reference to FIG. 5. In step S501, the data acquisition processing unit 304 confirms whether or not any instruction is given from a main thread. Here, the term "main thread" refers to the download processing (400). Here, the term "instruction" refers to a notification sent in step S407 and step S411.

If it is determined in step S501 that no instruction is given from the main thread, the data acquisition processing unit 304 waits until it receives an instruction in step S502.

If it is determined in step S501 that the download instruction is given from the main thread, the processing shifts to step S503. In step S503, the data acquisition processing unit 304 reserves a region of a download size instructed by the main thread in the transfer data storage unit 302.

In step S504, the data acquisition processing unit 304 confirms whether or not a TCP connection for file acquisition has already been connected to the server computer 101. If a TCP connection for file acquisition has not been connected, the TCP connection is established to the server computer 101 in step S505.

In step S506, the data acquisition processing unit 304 starts downloading a file instructed by the main thread. After completion of successful download, the file acquired in step S507 is transferred to the upper-level layer application 301. While, in the present embodiment, the acquired data is transferred to the upper-level layer application 301 after completion of download, data may also be transferred to the upper-level layer application 301 in the middle of data acquisition from the server computer 101. In the present embodiment, the upper-level layer application 301 causes the image processing apparatus to perform printing, and thus, the upper-level layer application 301 transmits print data to the image processing apparatus each time of data transfer in step S507. The file download processing and the print processing to the image processing apparatus may also be performed in parallel.

If the data acquisition processing unit 304 receives a termination instruction from the main thread in step S501, the processing shifts to step S508. The data acquisition processing unit 304 disconnects a connection for file acquisition in step S508 and provides a termination notification to the main thread in step S509. Here, the notification in step S509 corresponds to the main thread processing in step S412.

Since a non-communication time period may exist in the TCP connection for file acquisition used by the file acquisition thread, communication for confirming a connection, called a keep-alive, may also be made at regular intervals.

A description will be given of a change in behavior of TCP communication according to the present embodiment with reference to FIGS. 6A and 6B, where a time is plotted on the horizontal axis of each graph shown in FIGS. 6A and 6B and a congestion window size is plotted on the vertical axis thereof. The congestion window size is used for limiting the amount of data to be transmitted at a time so as not to occur congestion caused by the flow of a large amount of packets into the communication path in the TCP communication. Although there are various types of congestion-avoidance algorithms in the TCP, a typical method is to gradually increase the congestion window size from an initial small size and then to decrease the congestion window size again by detecting a packet loss, the delay of the response, and the like. The congestion window size is the amount of packets which can be transmitted at a time without a response, and thus, the vertical axis in FIGS. 6A and 6B may be regarded as a transfer speed.

Figure 6A:
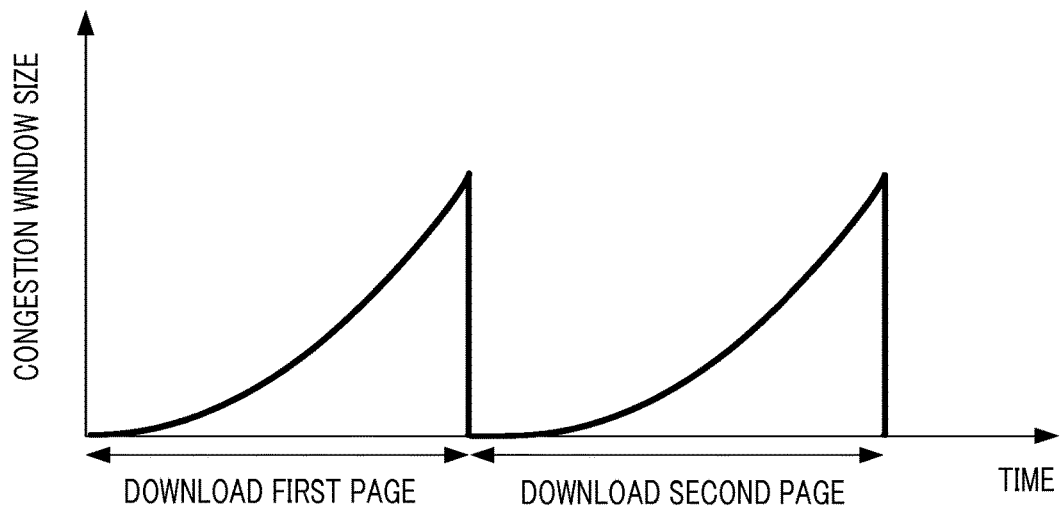
FIGS. 6A and 6B are graphs each illustrating a congestion window size with respect to a time to illustrate the effect of the present invention.
Figure 6B:
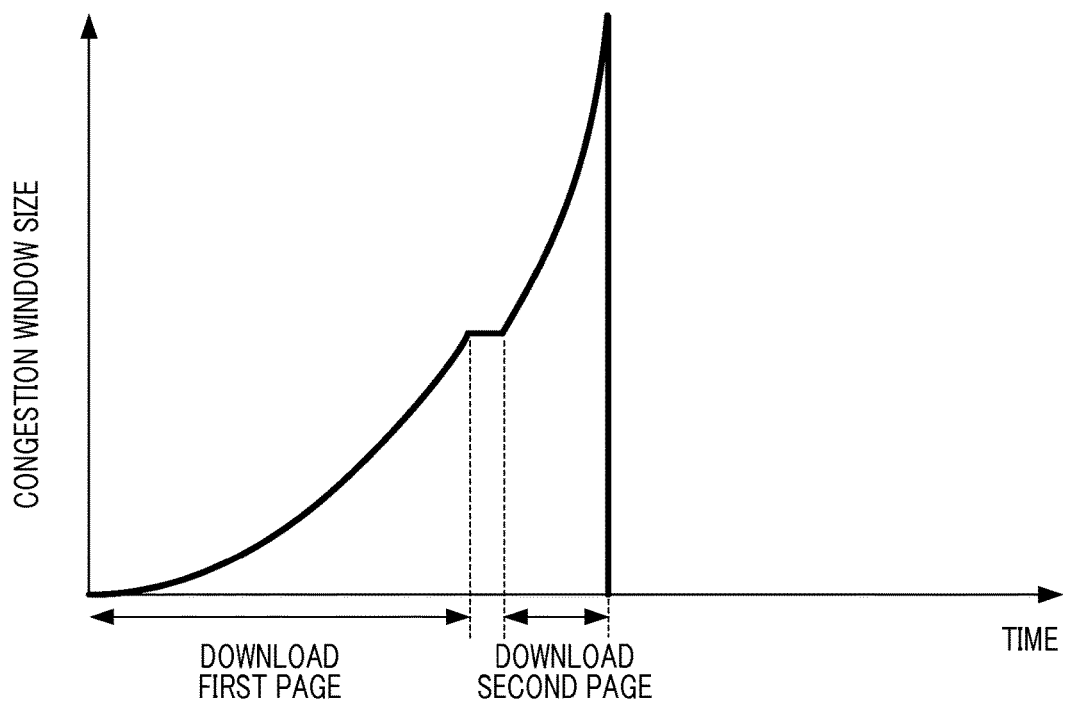

FIG. 6A shows the case of transfer using the existing method and FIG. 6B shows the case where the present embodiment is applied. In the example shown in FIGS. 6A and 6B, changes in congestion window size when the client computer 103 downloads two pages from the server computer 101 are shown. In FIG. 6A, connection is disconnected from the server computer 101 after downloading the first page. The reason for disconnection is that the client computer 103 requests to download the second page before the server computer 101 completely generates the second page. In this case, a TCP connection needs to be connected again after downloading the first page. The congestion window size needs to be adjusted again upon reconnection of the TCP connection, resulting in an insufficiency in taking advantage of a bandwidth.

In FIG. 6B, even when a request is made to acquire a second page before it is generated, only a connection for acquiring a file size is disconnected but a connection for file acquisition for use in actual download is not disconnected. Consequently, even if download is temporarily interrupted, a connection for file acquisition is maintained, so that the congestion window size is retained. Thus, a reduction in communication speed due to reconnection can be avoided, so that a bandwidth can be efficiently used for the second page and subsequent pages.

As described above, the information processing apparatus of the present invention may realize the speeding up of a data communication with a Web server by maintaining a communication connection for content acquisition with use of a plurality of communication connections. Disconnection and reconnection of the TCP connection for content acquisition can be avoided, so that the adverse effects of the slow-start of the TCP congestion-avoidance algorithm can be avoided. Thus, high-speed communication can be performed between a server computer and a client computer. In particular, high-speed communication can be performed in a long-distance wide band environment.

(Second Embodiment)

In the first embodiment, a description has been given of the case where the download management processing unit 303 selectively uses a connection for size acquisition and a connection for file acquisition so as to maintain the congestion window size against disconnection from the server computer 101. In the present embodiment, a description will be given of a method for downloading a file from the server computer 101 based on a multi-TCP connection in addition to the first embodiment.

Note that it is assumed that the server computer 101 can use the requirements of the first embodiment and a Range header required for split download. Since the method called as "division reception" using a multi-TCP connection, which is performed by the download management processing unit 303 and the data acquisition processing unit 304, is typically well known, no description will be given of its basic operation.

Here, division reception using a multi-TCP connection refers to a method for dividing some file desired to be downloaded from the server computer 101 into files and downloading the divided files in parallel using a plurality of TCP connections. The use of this method can alleviate a reduction in speed pertaining to the TCP in an environment having a large delay.

For example, a file may be evenly divided by the number of fixed TCP connections based on a file size, the number of TCP connections may be dynamically increased/decreased in accordance with a communication status, or the number of TCP connections may be inquired by a user. In the present embodiment, the number of TCP connections is passed from the upper-level layer application 301 to the download management processing unit 303.

Figure 7:
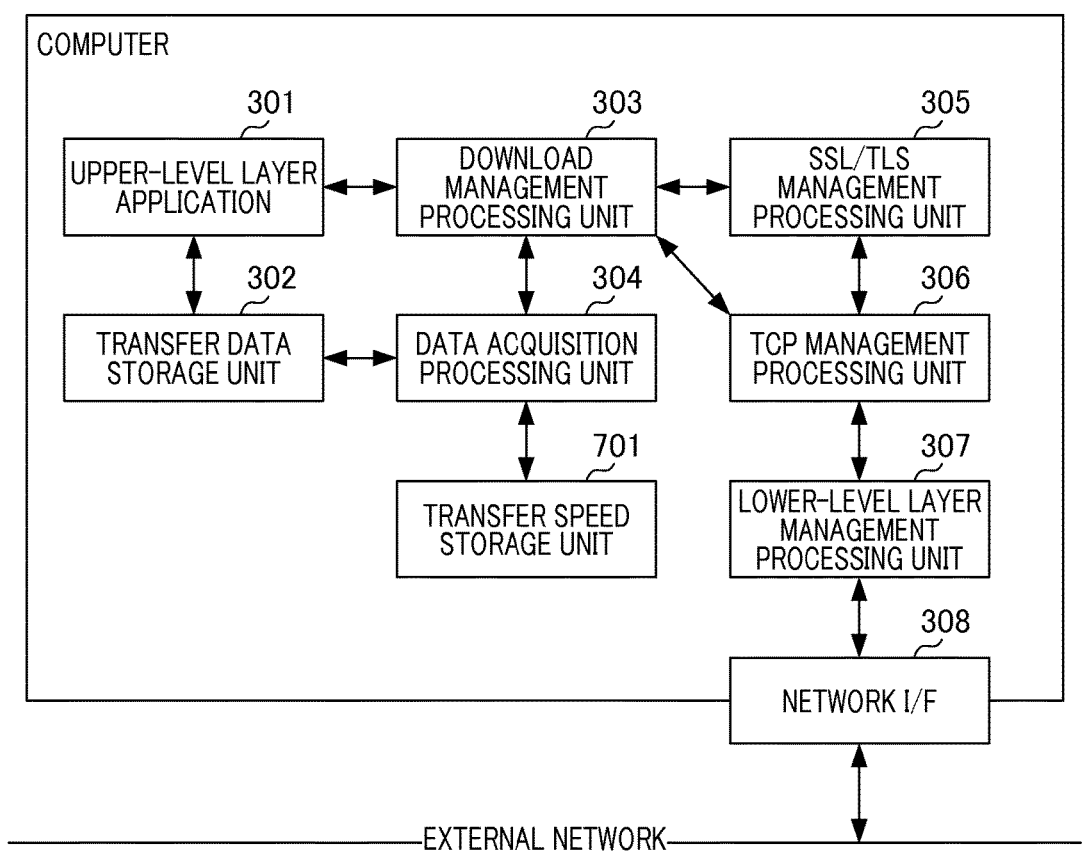
FIG. 7 is a diagram illustrating an example of a software configuration of an information processing apparatus according to a second embodiment.

A description will be given of a software configuration of the present embodiment with reference to FIG. 7. The configuration is the same as that of the first embodiment except for using a transfer speed storage unit 701, and an explanation will be omitted for the common parts. The transfer speed storage unit 701 is a region in which the transfer speeds of the TCP connections are stored and is used upon assignment of load of a file to be next acquired. The transfer speed storage unit 701 is reserved in the RAM 203, the external storage device 205, or the like. If necessary, the transfer speed storage unit 701 may also be reserved in the outside of a computer.

Figure 8:
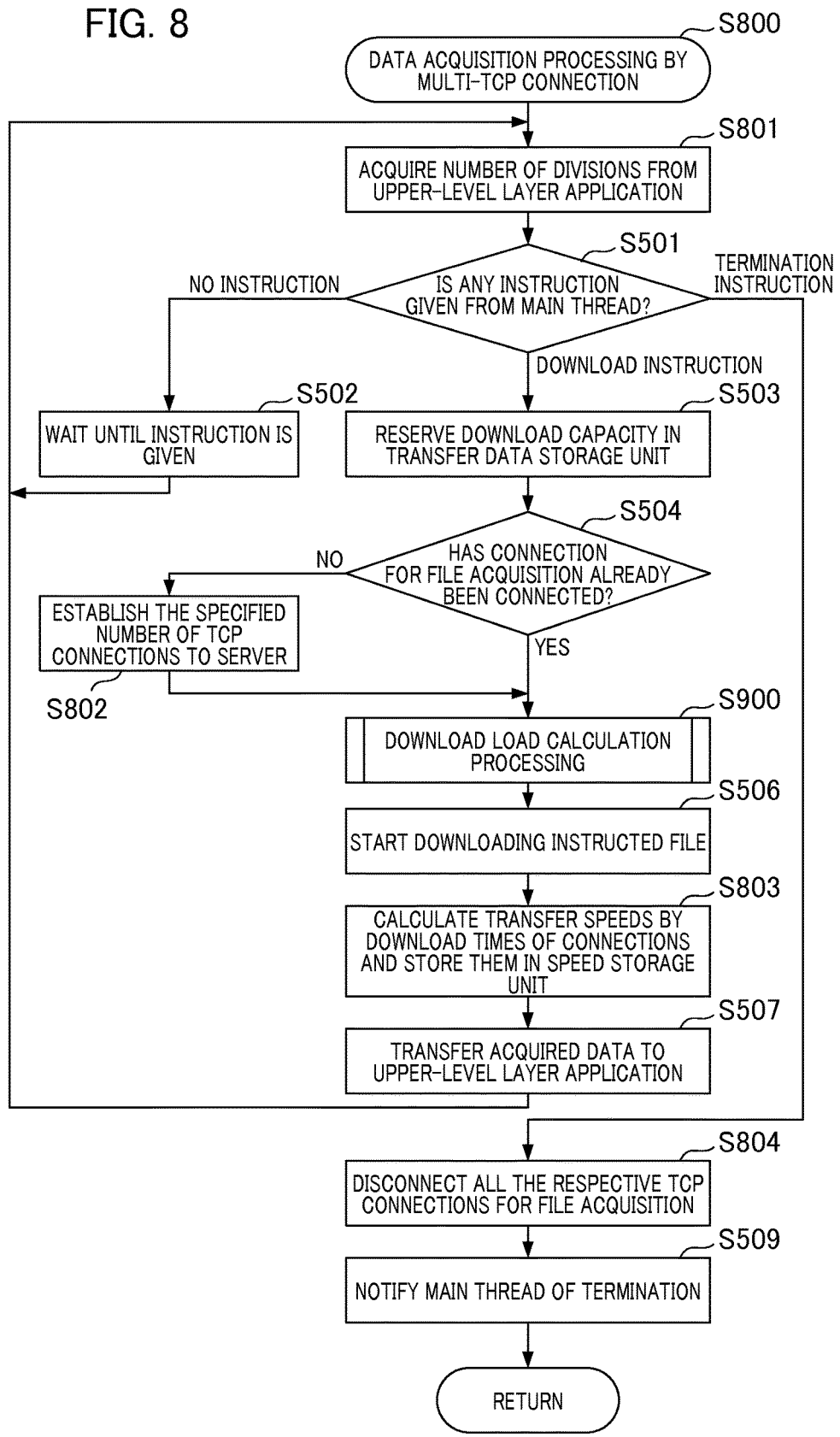
FIG. 8 is a flowchart illustrating data acquisition processing by a multi-TCP connection.

Next, a description will be given of the operation performed by the data acquisition processing unit 304 which performs multi-TCP connection communication with reference to FIG. 8. The processing in FIG. 8 partially overlaps with the file acquisition processing (500) described in the first embodiment. The overlapped portion has already been described in the first embodiment, and an explanation thereof will be omitted.

In step S801, the data acquisition processing unit 304 acquires the number of divisions from the upper-level layer application 301. The number of divisions is specified at the convenience of the upper-level layer application 301. For example, a small number of divisions is specified if the user does not want to impose a load on the server computer 101 whereas a large number of divisions is specified if speeding up is desired.

In step S802, the data acquisition processing unit 304 establishes TCP connections to the server computer 101 by the number of divisions acquired in step S801. Next, the data acquisition processing unit 304 performs download load calculation processing (900). The download load calculation processing (900) is processing for calculating an optimal load for each of the respective TCP connections. The data acquisition processing unit 304 starts download based on the load calculated in step S900 and stores the transfer speeds of the respective TCP connections in the transfer speed storage unit 701 in step S803. If a termination notification is sent from the main thread, the data acquisition processing unit 304 disconnects all the respective TCP connections connected in step S804.

Next, a detailed description will be given of download load calculation processing (900) with reference to FIG. 9.

In step S901, the data acquisition processing unit 304 confirms whether or not a download request is made for an initial file, i.e., a first file. If a download request is made for the first file, the processing shifts to step S902, and acquisition load is calculated to become uniform in the respective TCP connections. On the other hand, if a download request is not made for the first file, the processing shifts to step S903.

In step S903, the data acquisition processing unit 304 confirms whether or not there is a transfer-completed TCP connection. If there is no transfer-completed TCP connection, the processing shifts to step S904, and the data acquisition processing unit 304 waits until the transfer by one or more TCP connections is completed. If there is a transfer-completed TCP connection, the processing shifts to step S905.

In step S905, the data acquisition processing unit 304 acquires the transfer speeds of the respective TCP connections from the transfer speed storage unit 701. Next, in step S906, the data acquisition processing unit 304 also acquires the remaining amount of downloading of a transfer-incomplete TCP connection. The remaining amount of downloading is required for calculating a download load for the next file.

In step S907, the data acquisition processing unit 304 calculates the load for the respective TCP connections. The download load is calculated so as to minimize a download time for the next file to which a download request has been made. Any calculation method may be used as long as it can reduce a download time. In the present embodiment, the download load is calculated based on the size of the file to be next acquired to which a download request has been made, the transfer speed acquired in step S905, and the remaining amount of downloading acquired in step S906. In other words, if a file is not an initial file, the data acquisition processing unit 304 changes a load to be partitioned into the respective TCP connections for each file to be acquired in accordance with the communication speeds of the respective TCP connections.

A specific calculation method will be described. Firstly, a time taken until the remaining file is completely downloaded is calculated based on the transfer speed and the remaining amount of downloading. The data acquisition processing unit 304 selects a TCP connection in which a longest time is required until the remaining file is completely downloaded from among the download-incomplete TCP connections. The download time of the selected TCP connection is added as an estimated amount of downloading from the transfer speed of the download-completed TCP connection. The data acquisition processing unit 304 repeats the processing until the estimated amount of downloading exceeds the size of a file to which a download request has been made or all the download-incomplete TCP connections have been calculated. When the processing until the estimated amount of downloading is finally below the size of a file to which a download request has been made, the data acquisition processing unit 304 determines division of the remaining size in proportion to the transfer speeds of the respective TCP connections.

Finally, the data acquisition processing unit 304 returns the load calculated in step S908 and returns from the processing. As described above, according to the present embodiment, a time taken for completely downloading the files can be reduced even in an environment where the individual TCP connections have a different transfer speed.

(Other Embodiments)

While the exemplary embodiments of the present invention are described above in detail, the present invention may also be applied to a system formed of a plurality of apparatuses. The present invention may be applied to an apparatus formed of one appliance including a case where the apparatus is formed of a virtualized OS. The present invention also may be applied to a system in which an information processing apparatus is formed of cloud computing via the Internet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The execution environment of the program includes a personal computer, a virtual PC in which an operation system in the personal computer is virtualized, or a remote PC. The execution environment further includes a case where the program is executed by a computer built in an image processing apparatus, a printer, or a multifunction peripheral (MFP).

Therefore, the program code itself installed in the computer to realize the function processing of the present invention by the computer realizes the present invention. In other words, the computer program itself for realizing the function processing of the present invention is also included in the claim of the present invention. In that case, as long as the program has its function, the form of a program such as a program executed by an object code or an interpreter and script data supplied to the OS is not limited.

The program can also be supplied in such a manner that a computer is connected to a home page of the Internet using the browser of the client computer 103 and a program is downloaded to a recoding medium such as a hard disk from the home page. In this case, the computer program itself of the present invention or a compressed file including an automatic install function may be downloaded. The program can also be supplied in such a manner that the program codes forming the program of the present invention are divided into a plurality of files and their respective files are downloaded from different home pages. In other words, the claim of the present invention also includes a World Wide Web (WWW) server which causes a plurality of users to download a program file for the computer for realizing the function processing of the present invention.

The encrypted program of the present invention may be stored in a storage medium such as a DVD-ROM and distributed to users. In this case, a user who satisfies a predetermined condition is caused to download key information for decipherment from a home page via the Internet and the key information is used to install the encrypted program into the computer in an executable form.

The computer executes the read program to allow realizing the function in a form other than the form realizing the function of the above exemplary embodiment. For example, the OS running on the computer performs a part of or all of the actual processing based on instructions of the program and the function of the above exemplary embodiment can be realized by the processing.

Furthermore, the program read from the storage medium may be written in a memory provided on a function extension board inserted into the computer or a function extension unit connected to a computer. In this case, thereafter, the CPU provided on the function extension board or the function extension unit performs a part of or all of the actual processing based on instructions of the program and the function of the above exemplary embodiment can be realized by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-270559, filed on Dec. 26, 2013, which is hereby incorporated by reference herein in its entirety.

What is claimed is:

1. An information processing apparatus comprising:
a processor; and
a memory coupled to at least the processor and having stored thereon instructions which, when executed by at least the processor, cause the information processing apparatus to perform operations comprising
establishing, by a management unit, a first Transmission Control Protocol communication connection with a server device and a second Transmission Control Protocol communication connection with the server device in response to acquiring a communication start request from an application installed in the information processing apparatus;
acquiring, by a first communication unit information indicating whether or not content has been generated from the server device which dynamically generates the content using the first Transmission Control Protocol communication connection;
downloading, by a second communication unit, the generated content using the second Transmission Control Protocol communication connection; and
executing, by a printing unit, a print process for transmitting print data based on the downloaded content to an image processing apparatus, in parallel with downloading the content that has been completely generated by the server device using the second Transmission Control Protocol communication connection by the second communication unit,
wherein the first communication unit does not download the generated content using the first Transmission Control Protocol communication connection,
wherein the management unit transmits a download instruction to the second communication unit in response to the first communication unit acquiring information indicating that the content has been generated and instructs the first Transmission Control Protocol communication connection to disconnect from the first communication unit in response to confirming that there is no download incomplete content in the server device and instructs the second Transmission Control Protocol communication connection to disconnect from the second communication unit after instructing disconnection of the first Transmission Control Protocol communication connection,
wherein the second communication unit continues to download the content generated in accordance with the download instruction from the management unit while maintaining the second Transmission Control Protocol communication connection until the disconnection of the second Transmission Control Protocol communication connection is instructed by the management unit.

2. The information processing apparatus according to claim 1, wherein the first communication unit acquires each file size of the content,
wherein the management unit transmits the download instruction for downloading a file of which the file size has been acquired to the second communication unit.

3. The information processing apparatus according to claim 2, wherein the management unit establishes a plurality of the second Transmission Control Protocol communication connections, divides the file of which the file size has been acquired into files, and transmits the download instruction for downloading the divided files in parallel to the second communication unit.

4. The information processing apparatus according to claim 3, wherein, if the file is an initial file, the management unit uniformly partitions a load of acquiring the file into the second Transmission Control Protocol communication connections.

5. The information processing apparatus according to claim 4, wherein, if the file is not the initial file, the management unit changes the load to be partitioned into the second Transmission Control Protocol communication connections for each file to be acquired in accordance with the transfer speed of each of the second Transmission Control Protocol communication connections.

6. The information processing apparatus according to claim 2, wherein, if there is the second Transmission Control Protocol communication connection through which the file has completely downloaded, the management unit calculates the load of a file to be next acquired based on the size of the file to be next downloaded, the transfer speed of each of the second Transmission Control Protocol communication connections, and the remaining amount of downloading for second Transmission Control Protocol communication connection through which the file has not completely downloaded to partition the load into the second Transmission Control Protocol communication connections.

7. A control method for controlling an information processing apparatus, the method comprising:
establishing, by a management step, a first Transmission Control Protocol communication connection with a server device and a second Transmission Control Protocol communication connection with the server device in response to acquiring a communication start request from an application installed in the information processing apparatus;

acquiring, in a first communication step, information indicating whether or not content has been generated from the server device which dynamically generates the content using the first Transmission Control Protocol communication connection;

downloading, in a second communication step the generated content using the second Transmission Control Protocol communication connection; and executing, in a printing step, a print process for transmitting print data based on the downloaded content to an image processing apparatus, in parallel with downloading the content that has been completely generated by the server device using the second Transmission Control Protocol communication connection in the second communication step, wherein the generated content is not downloaded by using the first Transmission Control Protocol communication connection in the first communication step, wherein, in the management step, a download instruction is transmitted in the second communication step in response to information indicating that the content has been generated acquired in the first communication step and the first Transmission Control Protocol communication connection is instructed to disconnect in response to confirming that there is no download incomplete content in the server device and the second Transmission Control Protocol communication connection is instructed to disconnect after instructing disconnection of the first Transmission Control Protocol communication connection, wherein downloading the content generated in accordance with the download instruction in the management step is continued while maintaining the second communication connection in the second communication step until the instruction to disconnect the second Transmission Control Protocol communication connection in the management unit.

8. The control method according to claim 7, wherein, in the first communication step, each file size of the content is acquired, and wherein in the management step, the download instruction for the downloading a file of which the file size has been acquired is transmitted to the second communication connection in the second communication step.

9. The control method according to claim 8, wherein, in the management step, the second Transmission Control Protocol communication connection is established in plural, the file of which the file size has been acquired is divided into files, and the download instruction for downloading the divided files in parallel is transmitted to the second communication connection in the second communication step.

10. The control method according to claim 9, wherein, in the management step, if the file is an initial file, a load of acquiring the file is uniformly partitioned into the second Transmission Control Protocol communication connections.

11. The control method according to claim 10, wherein, in the management step, if the file is not the initial file, the load to be partitioned into the second Transmission Control Protocol communication connections is changed for each file to be acquired in accordance with the transfer speed of each of the second Transmission Control Protocol communication connections.

12. The control method according to claim 8, wherein, in the management step, if there is the second Transmission Control Protocol communication connection through which the file has completely downloaded, the load of a file to be next downloaded based on the size of the file to be next acquired, the transfer speed of each of the second Transmission Control Protocol communication connections, and the remaining amount of downloading for second Transmission Control Protocol communication connection through which the file has not completely downloaded is calculated to partition the load into the second Transmission Control Protocol communication connections.

13. A non-transitory computer-readable storage medium on which is stored a computer program for making a computer execute a control method of an information processing apparatus, the method comprising:

establishing, by a management step, a first Transmission Control Protocol communication connection with a server device and a second Transmission Control Protocol communication connection with the server device in response to acquiring a communication start request from an application installed in the information processing apparatus;

acquiring in a first communication step, information indicating whether or not content has been generated from the server device which dynamically generates the content using the first Transmission Control Protocol communication connection;

downloading, in a second communication step, the generated content using the second Transmission Control Protocol communication connection; and executing, in a printing step, a print process for transmitting print data based on the downloaded content to an image processing apparatus, in parallel with downloading the content that has been completely generated by the server device using the second Transmission Control Protocol communication connection in the second communication step, wherein the generated content is not downloaded by using the first Transmission Control Protocol communication connection in the first communication step, wherein, in the management step, a download instruction is transmitted in the second communication step in response to information indicating that the content has been generated acquired in the first communication step and the first Transmission Control Protocol communication connection is instructed to disconnect in response to confirming that there is no download incomplete content in the server device and the second Transmission Control Protocol communication connection is instructed to disconnect after instructing disconnection of the first Transmission Control Protocol communication connection, wherein downloading the content generated in accordance with the download instruction in the management step is continued while maintaining the second communication connection in the second communication step until the instruction to disconnect the second Transmission Control Protocol communication connection in the management unit.

14. The non-transitory computer-readable storage medium according to claim 13, wherein, in the first communication step, each file size of the content is acquired, and wherein in the management step, the download instruction for downloading a file of which the file size has been acquired is transmitted to the second communication connection in the second communication step.

15. The non-transitory computer-readable storage medium according to claim 14, wherein, in the management step, the second Transmission Control Protocol communication connection is established in plural, the file of which the file size has been acquired is divided into files, and the download instruction for downloading the divided files in parallel is transmitted to the second communication connection in the second communication step.

16. The non-transitory computer-readable storage medium according to claim 15, wherein, in the management step, if the file is an initial file, a load of acquiring the file is uniformly partitioned into the second Transmission Control Protocol communication connections.

17. The non-transitory computer-readable storage medium according to claim 16, wherein, in the management step, if the file is not the initial file, the load to be partitioned into the second Transmission Control Protocol communication connections is changed for each file to be acquired in accordance with the transfer speed of each of the second Transmission Control Protocol communication connections.

18. The non-transitory computer-readable storage medium according to claim 14, wherein, in the management step, if there is the second Transmission Control Protocol communication connection through which the file has completely downloaded, the load of a file to be next downloaded based on the size of the file to be next acquired, the transfer speed of each of the second Transmission Control Protocol communication connections, and the remaining amount of downloading for second Transmission Control Protocol communication connection through which the file has not completely downloaded is calculated to partition the load into the second Transmission Control Protocol communication connections.

\* \* \* \* \*